June 2, 1953　　　　J. JINDRICH　　　2,640,464
AGITATING TYPE STOCK FEEDER
Filed June 22, 1951　　　　　2 Sheets-Sheet 1
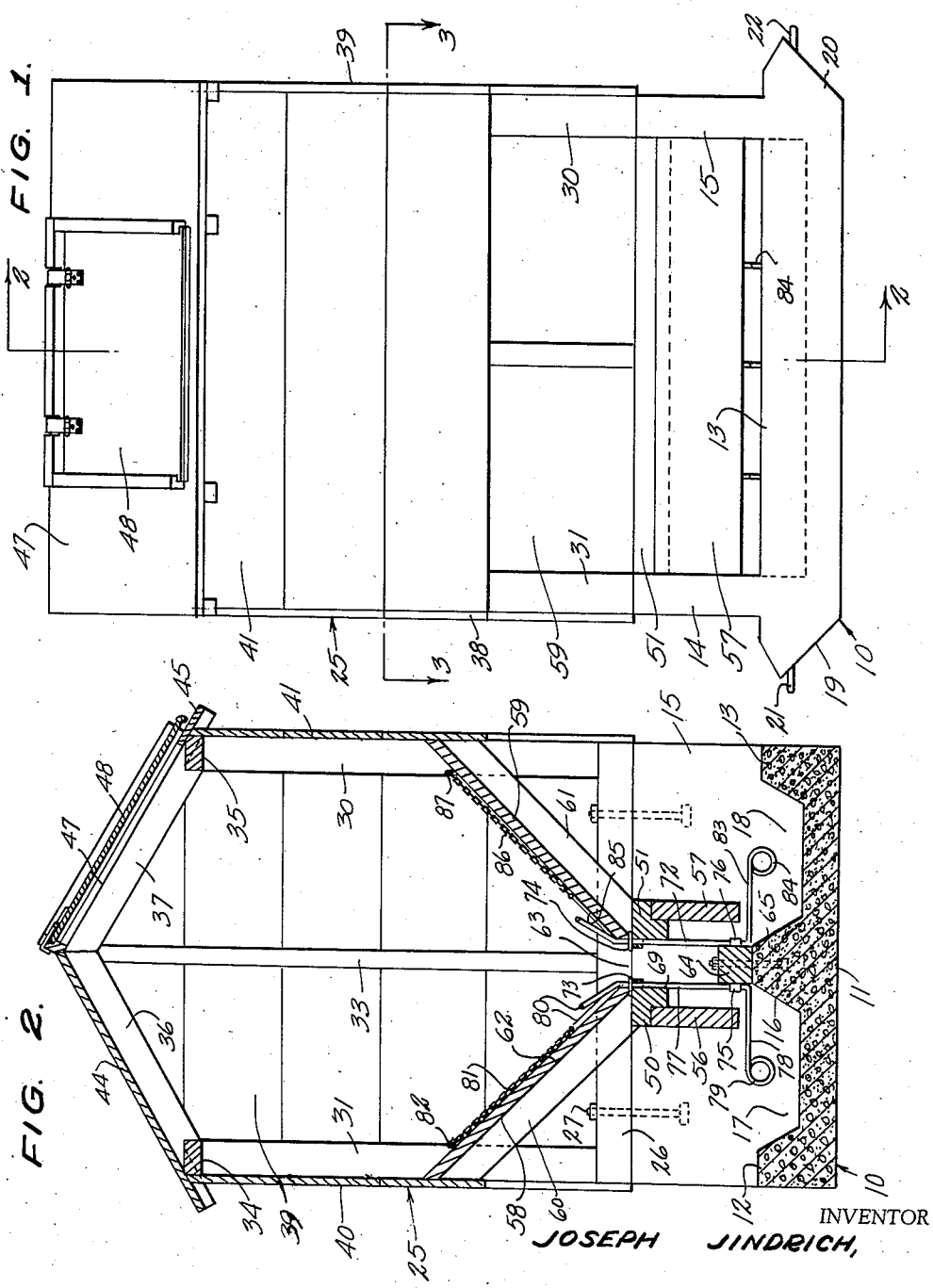
INVENTOR
JOSEPH JINDRICH,
BY
McMorrow, Berman + Davidson
ATTORNEYS.

June 2, 1953  J. JINDRICH  2,640,464
AGITATING TYPE STOCK FEEDER
Filed June 22, 1951  2 Sheets-Sheet 2

INVENTOR
JOSEPH JINDRICH,
BY
McMorrow, Berman & Davidson
ATTORNEYS.

Patented June 2, 1953

2,640,464

UNITED STATES PATENT OFFICE 2,640,464

AGITATING TYPE STOCK FEEDER

Joseph Jindrich, Marengo, Iowa

Application June 22, 1951, Serial No. 232,941

4 Claims. (Cl. 119—54)

This invention relates to stock feeders and more particularly to an automatic feeder for feeding hogs.

It is among the objects of the invention to provide an improved hog feeder which will store a quantity of feed and dispense the feed as it is consumed over a period of time, preferably of several days' duration; which has a cast concrete base providing leakproof feed troughs and a durable construction which will not rot and will not be damaged by the hogs using the feeder; which maintains the stored feed in a dry and readily dispensable condition; which can be easily moved from place to place; which can be easily filled from a wagon or truck; and which is simple and durable in construction, economical to manufacture, and effective to maintain a supply of feed available at all times and prevent waste and contamination of the feed.

Other objects and advantages will become apparent from a consideration of the following description and the appended claims in conjunction with the accompanying drawings wherein:

Figure 1 is a side elevational view of a hog feeder illustrative of the invention;

Figure 2 is a cross sectional view on the line 2—2 of Figure 1;

Figure 3:
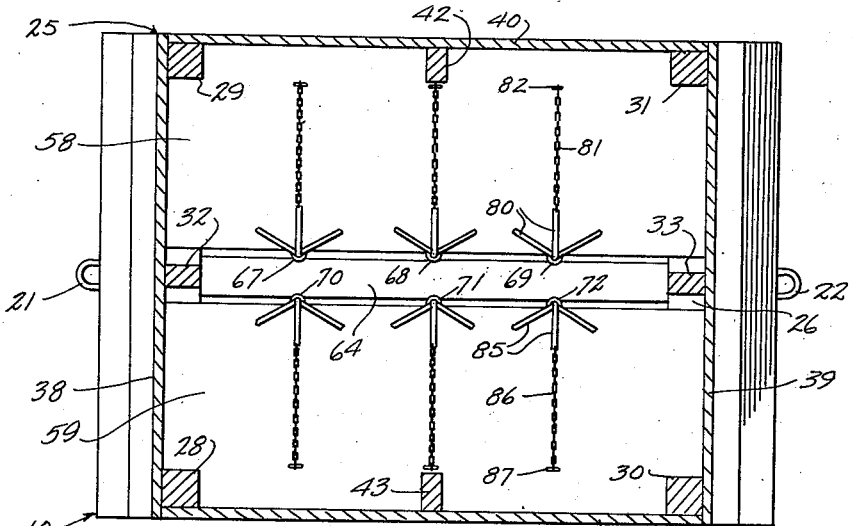
Figure 3 is a transverse cross sectional view on the line 3—3 of Figure 1.
Figure 4:
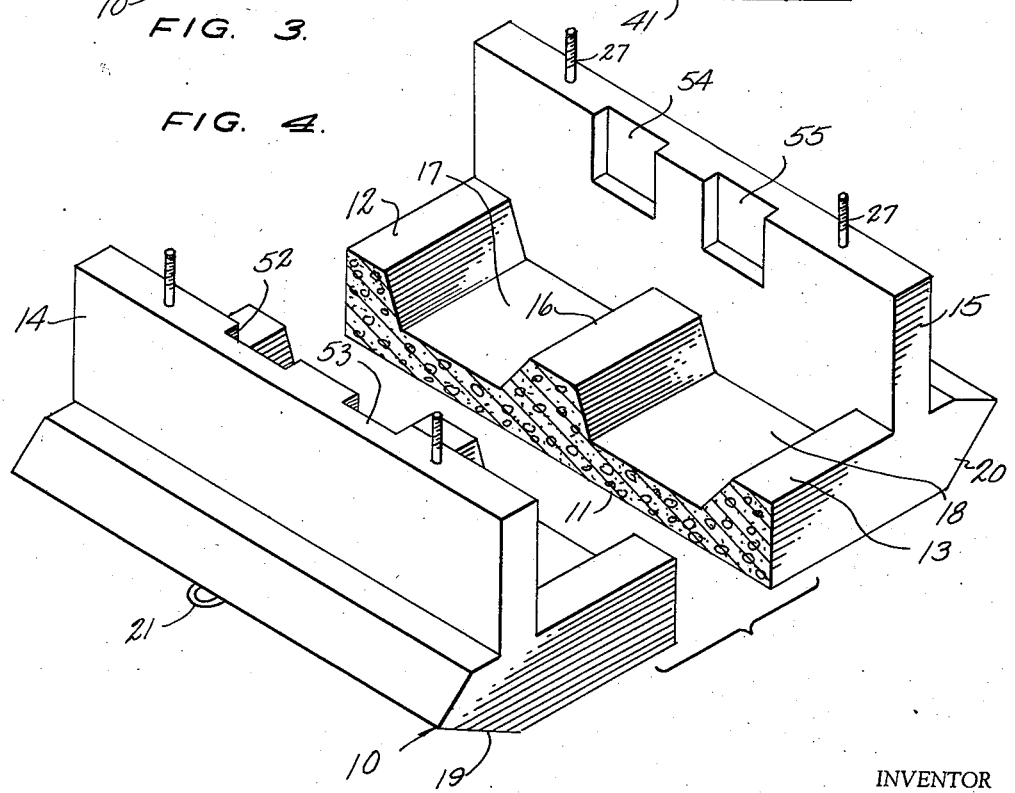
Figure 4 is a fragmentary perspective view of a cast concrete base of the feeder.

With continued reference to the drawings, the feeder has a flat cast concrete base, generally indicated at 10, of rectangular shape and having a flat bottom surface 11, side walls 12 and 13 extending one along each longitudinal edge thereof and projecting upwardly therefrom, end walls 14 and 15 extending one along each end edge thereof and extending upwardly therefrom materially above the upper edges of said side wall and a central ridge 16 extending between said end walls substantially parallel to said side walls and spaced substantially equal distances from the latter.

The inner sides of the side walls 12 and 13 are downwardly and inwardly inclined and both sides of the central ridge 16 are inclined downwardly toward the adjacent side walls to provide between the side walls and the central ridge a pair of feed troughs 17 and 18 disposed in side by side relationship to each other and one at each side of the central ridge 16.

The base 10 being formed of cast concrete, the troughs are leakproof and the base will not rot or be deteriorated by weather conditions and cannot be damaged by the feeding hogs.

The outer surfaces of the end walls of the base are upwardly and outwardly inclined from the flat bottom wall 11, as indicated at 19 and 20, to provide a sled runner effect at each end of the base and towing eyes 21 and 22 are partially embedded in the base and project outwardly therefrom, one at the mid-length location of each end of the base and near the upper edges of the inclined portions 19 and 20.

With this arrangement, the feeder can be moved from place to place by hooking it to a farm tractor or other suitable towing vehicle by connecting one of the towing eyes to the towing vehicle.

A receptacle, generally indicated at 25, of rectangular shape, is mounted on the base 10 and comprises a pair of end frames, each including a sill 26 disposed on the top surface of the corresponding base end wall 14 or 15 and secured to the base by suitable means, such as the bolts 27 embedded in the corresponding base end wall and extending through a bolt hole in the sill.

Corner posts, as indicated at 28, 29, 30 and 31 in Figure 3, have their lower ends resting upon the end frame sills, one at each end of each sill and extending upwardly from the sill substantially perpendicular thereto.

Center posts, as indicated at 32 and 33, are disposed one in each end frame of the receptacle and each center post rests at its lower end on the corresponding sill and extends upwardly midway between and substantially parallel to the corresponding corner post. Plates, as indicated at 34 and 35 in Figure 2, connect the end frames at the upper ends thereof and are disposed above and substantially parallel to the base side walls 12 and 13 respectively. The plate 34 rests at one end on the upper end of the corner post 29 and at its other end on the upper end of the corner post 31, while the plate 35 rests at one end on the upper end of the corner post 28 and at its other end on the upper end of the corner post 30.

Rafters, as indicated at 36 and 37 in Figure 2, have their lower ends seated on the plates 34 and 35 and their upper ends abutting above and midway between the plates, the end pairs of rafters resting at their upper ends on the center posts 32 and 33 of the end frames. Siding structures, as indicated at 38 and 39 complete the end structures of the receptacle and comprise a siding board nailed to the outer side of the corner and center posts and the end pairs of rafters constituting the two end frames of the receptacle.

Siding structures 40 and 41 cover the sides of the receptacle and comprise siding boards secured at their ends to the outer sides of the corner posts of the end frames of the receptacle. These siding structures are reinforced by studs, as indicated at 42 and 43, secured to the inner sides of the siding structures 40 and 41 midway between the corresponding corner posts.

A roof structure is mounted on the rafters and comprises two portions 44 and 45 inclined downwardly and outwardly from the mid-width location of the receptacle to locations spaced outwardly of the plates 34 and 35, as is clearly illustrated in Figure 2. The roof portion 45 is provided with a rectangular opening 47 therein to provide a filler opening for the receptacle and this opening is covered by a hinge hatch 48 which can be manually raised when it is desired to replenish the feed supply in the receptacle.

A pair of beams 50 and 51 extend longitudinally of the receptacle in spaced apart and substantially parallel relationship to each other above the center ridge 16 of the base 10. These beams are spaced substantially equal distances from the mid-width location of the receptacle and have their upper surfaces disposed against the under surfaces of the end frame sills of the receptacle. The end walls 14 and 15 of the base are provided with recesses, as indicated at 52 and 53 for the end wall 14, and 54 and 55 for the end wall 15, which open to the upper edges of the end walls at substantially equal distances from the mid-length locations of the end walls and receive the ends of the beams 50 and 51 to firmly support these beams in the structure. Each of the beams 50 and 51 is rabbeted out along its lower, outer edge to provide grooves of inverted L shape and reinforcing joists 56 and 57 have their upper edges received in these grooves and depend from the beams 50 and 51 respectively, the lower edges of these joists being spaced laterally from and slightly above the top surface of the central ridge 16 of the base.

Floor portions 58 and 59 are disposed in the lower portion of the receptacle and are inclined upwardly and outwardly from the upper inner edges of the beams 50 and 51 respectively, to the side wall structures 40 and 41 of the receptacle at locations spaced above the end wall sills, as is clearly illustrated in Figure 2.

The floor portions comprise inclined joists, as indicated at 60 and 61 in Figure 2, extending from the beams 50 and 51 upwardly and outwardly toward the side wall structures 40 and 41 of the receptacle, there being one floor joist at each end of each beam and one adjacent the mid-length location of each beam, and floor boards 62 secured on the upper surfaces of the floor joists and extending longitudinally of the receptacle from one end wall structure to the other end wall structure thereof. At their lower, inner edges the floor portions are spaced apart to provide a dispensing slot 63 through which feed falls from the space within the receptacle above the inclined floor portion downwardly toward the feed troughs 17 and 18.

A wooden cap member or plate 64 is mounted on the upper surface of the central ridge 16 of the base and secured to the central ridge by suitable means, such as the bolts 65 embedded in the central ridge and extending through bolt holes in the plate. It will be noted that the members 56 and 57 are spaced at their lower edges substantially equal distances laterally from the adjacent sides of the plate 64.

Agitating levers, as indicated at 67 to 72 inclusive in Figure 3, are pivotally mounted on the beams 50 and 51 and the plate 64.

As is particularly illustrated in Figure 2 for the levers 69 and 72, suitable lugs or washers 73 and 74 are mounted on the upper surfaces of the beams 50 and 51 and project inwardly from the inner sides of these beams and suitable bearing sleeves or staples, as indicated at 75 and 76, are mounted on the cap or plate 64, one at each side of the latter. The lever 69 has a substantially straight intermediate portion 77 which extends through and is journaled in the lug 73 and the bearing sleeve 75, this portion of the lever being disposed substantially perpendicular to the plate 69 and the beam 50 and against the inner side of the sill. The lower end portion 78 of the lever 69 extends from the bearing sleeve 75 away from the plate 64 transversely of the upper side of the feeding trough 17 and is provided with a terminal ring or loop 79.

At its upper end the lever 69 is provided with a crowfoot structure 80 adjacent the upper surface of the floor portion 58 and a chain 81 is connected at one end to the end of the central prong of the crowfoot structure 80. At its other end the chain is connected by a pin or hook 82 to the floor portion 58 adjacent the upper, outer edge of the floor portion.

The lever 72 has a lower end portion 83 extending outwardly from the plate 64 transversely of the upper side of the feed trough 18 and terminating in a ring or loop 84 and has its its upper end a crowfoot structure 85, the central prong of which is connected at its end to one end of a chain 86, the other end of the chain being connected by a hook or pin 87 to the floor portion 59 near the upper, outer edge of this floor portion.

With this arrangement, when the terminal rings or loops of the agitating levers are stuck and moved by the feeding hogs, the crowfoot structures of the levers are moved relative to the upper sides of the corresponding floor structures and the chains connected to these crowfoot structures are also moved causing the feed in the hopper above the floor portions to feed downwardly through the feed slot 63 and between the vane members 56 and 57 and the cap 64 into the feed troughs 17 and 18.

The agitating levers are arranged in pairs spaced apart substantially equal distances longitudinally of the plate 64 with the two levers of each pair disposed at respectively opposite sides of the plate and with their center lines substantially in a plane perpendicular to the longitudinal center line of the plate. This provides for substantially uniform dispensing of the feed throughout the length of the dispensing slot 63 as hogs feed from the troughs 17 and 18.

The particular formation and operating characteristics of the agitating levers or members are believed worthy of special note. As will be noted from Figure 2, I have formed each of said levers or members substantially to an L shape, the lower end portions 78, 83 constituting horizontally extended legs that are integral with and project radially of the lower ends of the straight, vertically disposed, intermediate portions of the members. Said vertical legs, as will be seen, are mounted upon the beams 50, 51 and the plate 64 for axial rotation on a vertical axis.

In this connection, the crow foot structure of each agitating member is rigid with the upper end of the vertical leg of the member and includes a plurality of agitating fingers each of which is oblique to the axis of rotation of the vertical leg of the agitating member. The several fingers of each crow foot structure diverge outwardly from said vertical leg, and at their convergent, inner ends meet at the axis of the vertical leg.

By reason of this arrangement, it will be seen that when the feeding hogs swing the horizontal legs of the agitating members to right or left within the feed troughs, the outer ends of said horizontal legs will be caused to travel through arcuate paths about the axis of rotation of the vertical legs of the agitating members. The vertical legs will thus be rotatably moved, and as a result, the outer ends of the several fingers of the crow foot structures will also be caused to travel through arcuate paths within the supply of feed contained in the hopper above the dispensing slot.

The inclined plane of each floor portion 58 or 59 is tangential to the arcuate path described by at least that finger of the crow foot structure associated with said floor portion and connected to the lower end of the flexible agitating element 81 or 86. As a result, when the finger connected to the lower end of the flexible element swings through its arcuate path away from the floor portion, it tends not only to shift the lower end of the flexible element laterally, but also outwardly away from the floor portion into the supply of feed supported on said floor portion. The flexible element is thus continually being alternately tightened and slackened, while being moved from side to side at its lower end within the feed. This action, in cooperation with the several fingers of the crow foot structure that are moving through arcuate paths within the feed supply immediately adjacent the dispensing slot, is considered effective in promoting efficient agitation and dispensing of the feed.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hog feeder comprising: a base having side by side feed troughs separated by a center ridge; a hopper above the base having downwardly converging floor portions spaced apart at their convergent lower edges to define a dispensing slot extending parallel to and spaced vertically of the center ridge; a series of agitating members each of which is formed substantially to an L shape and is provided with a vertical leg extending between and rotatably mounted at its upper and lower ends upon the lower edge of a floor portion and the center ridge respectively, a horizontal leg rigid with and extending radially from the lower end of the vertical leg into the feed trough to impart rotatable movement to the vertical leg responsive to swinging of the horizontal leg by a hog feeding from the trough, and a finger rigid at one end with and extending obliquely from the upper end of the vertical leg within the hopper so as to describe an arcuate path at its other end within a quantity of feed contained in the hopper on rotatable movement of the vertical leg; and a series of flexible elements associated with the respective agitating members, each flexible element being anchored at one end to a floor portion and being connected at its other end to a finger, for alternate tightening and slackening of the element within said quantity of feed simultaneous with movement of said other end of the element away from and toward its associated floor portion.

2. A hog feeder comprising: a base having side by side feed troughs separated by a center ridge; a hopper above the base having downwardly converging floor portions spaced apart at their convergent lower edges to define a dispensing slot extending parallel to and spaced vertically of the center ridge; a series of agitating members each of which is formed substantially to an L shape and is provided with a vertical leg extending between and rotatably mounted at its upper and lower ends upon the lower edge of a floor portion and the center ridge respectively, a horizontal leg rigid with and extending radially from the lower end of the vertical leg into the feed trough to impart rotatable movement to the vertical leg responsive to swinging of the horizontal leg by a hog feeding from the trough, and a finger rigid at one end with an extending obliquely from the upper end of the vertical leg within the hopper so as to describe an arcuate path at its other end within a quantity of feed contained in the hopper on rotatable movement of the vertical leg; and a series of flexible elements associated with the respective agitating members, each flexible element being anchored at one end to a floor portion and being connected at its other end to a finger, for alternate tightening and slackening of the element within said quantity of feed simultaneous with movement of said other end of the element away from and toward its associated floor portion, each of said elements comprising a single length of material of highly flexible characteristics extending downwardly within its associated floor portion for substantially the full distance between the upper and lower edges of the floor portion.

3. A hog feeder comprising: a base having side by side feed troughs separated by a center ridge; a hopper above the base having downwardly converging floor portions spaced apart at their convergent lower edges to define a dispensing slot extending parallel to and spaced vertically of the center ridge; a series of agitating members each of which is formed substantially to an L shape and is provided with a vertical leg extending between and rotatably mounted at its upper and lower ends upon the lower edge of a floor portion and the center ridge respectively, a horizontal leg rigid with and extending radially from the lower end of the vertical leg into the feed trough to impart rotatable movement to the vertical leg responsive to swinging of the horizontal leg by a hog feeding from the the trough, and a finger rigid at one end with and extending obliquely from the upper end of the vertical leg within the hopper so as to describe an arcuate path at its other end within a quantity of feed contained in the hopper on rotatable movement of the vertical leg; and a series of flexible elements associated with the respective agitating members, each flexible element being anchored at one end to a floor portion and being connected at its other end to a finger, for alternate tightening and slackening of the element within said quantity of feed simultaneous with movement of said other end of the element away from and toward its associated floor portion, each of said elements comprising a single length of material of highly flexible characteristics extending downwardly within its associated floor portion for substantially the full distance between the upper and lower edges of the floor portion, the plane of each floor portion being tangential to the arcuate paths described within the hopper by the fingers associated therewith.

4. A hog feeder comprising: a base having side by side feed troughs separated by a center ridge; a hopper above the base having downwardly converging floor portions spaced apart at their convergent lower edges to define a dispensing slot extending parallel to and spaced vertically of the center ridge; a series of agitating members each of which is formed substantially to an L shape and is provided with a vertical leg extending between and rotatably mounted at its upper and lower ends upon the lower edge of a floor portion and the center ridge respectively, a horizontal leg rigid with and extending radially from the lower end of the vertical leg into the feed trough to impart rotatable movement to the vertical leg responsive to swinging of the horizontal leg by a hog feeding from the trough, and a crow foot structure disposed in the hopper at the upper end of each vertical leg, each crow foot structure including a plurality of fingers diverging outwardly from and having inner ends rigid with the upper end of their associated vertical leg, said fingers of each crow foot structure extending obliquely from the upper end of the vertical leg to which they are secured, so as to describe arcuate paths at their outer ends within a quantity of feed contained in the hopper on rotatable movement of said vertical leg; and a series of flexible elements associated with the respective agitating members, each flexible element being anchored at one end to a floor portion and being connected at its other end to the outer end of one of said fingers, for alternate tightening and slackening of the element within said quantity of feed simultaneous with movement of said other end of the element away from and toward its associated floor portion, each of said elements comprising a single length of material of highly flexible characteristics extending downwardly within the hopper along the surface of its associated floor portion for substantially the full distance between the upper and lower edges of the floor portion, the plane of each floor portion being tangential to the arcuate paths described within the hopper by those fingers connected to the flexible elements.

JOSEPH JINDRICH.

References Cited in the file of this patent

UNITED STATES PATENTS

| Number | Name | Date |
|---|---|---|
| 1,346,027 | Hiner et al. | July 6, 1920 |
| 1,469,129 | Westerman | Sept. 25, 1923 |
| 1,719,245 | Smidley | July 2, 1929 |
| 1,805,902 | Biel | May 19, 1931 |
| 2,363,212 | Wagner | Nov. 21, 1944 |
| 2,408,477 | Payne | Oct. 1, 1946 |